United States Patent [19]

Greiert, Jr.

[11] 4,421,349
[45] Dec. 20, 1983

[54] COWLING LATCH

[75] Inventor: Alfred H. Greiert, Jr., Valley Center, Kans.

[73] Assignee: The Boeing Company, Seattle, Wash.

[21] Appl. No.: 335,224

[22] Filed: Dec. 28, 1981

[51] Int. Cl.³ .................. E05C 9/00; E05C 19/06; E05C 19/14
[52] U.S. Cl. .................................. 292/19; 292/27; 292/66; 292/82; 292/113; 292/DIG. 31
[58] Field of Search .......... 292/19, 66, 113, DIG. 14, 292/DIG. 49, DIG. 31, DIG. 4, 247, 27, 111, 82, 83, 85, 259, 260, 1

[56] References Cited

U.S. PATENT DOCUMENTS

| 2,446,113 | 7/1948 | Spiller | 292/27 X |
| 2,710,214 | 6/1955 | Summers | 292/247 |
| 3,466,075 | 9/1969 | Fernandez et al. | 292/19 |
| 4,053,177 | 10/1977 | Stammreich et al. | 292/113 |
| 4,183,564 | 1/1980 | Poe | 292/113 |

FOREIGN PATENT DOCUMENTS

| 612104 | 7/1926 | France | 292/27 X |
| 2983 | of 1902 | United Kingdom | 292/27 X |
| 993419 | 5/1965 | United Kingdom | 292/27 X |

Primary Examiner—Thomas J. Holfo
Assistant Examiner—R. Illich
Attorney, Agent, or Firm—Edwin H. Crabtree

[57] ABSTRACT

A cowling latch for an engine nacelle or the like. The latch characterized by having a collet for engaging a pin extending outwardly from a keeper assembly. The collet when the latch handle is in a closed position secures the pin against the movement of the latch in tension and in shear.

5 Claims, 3 Drawing Figures

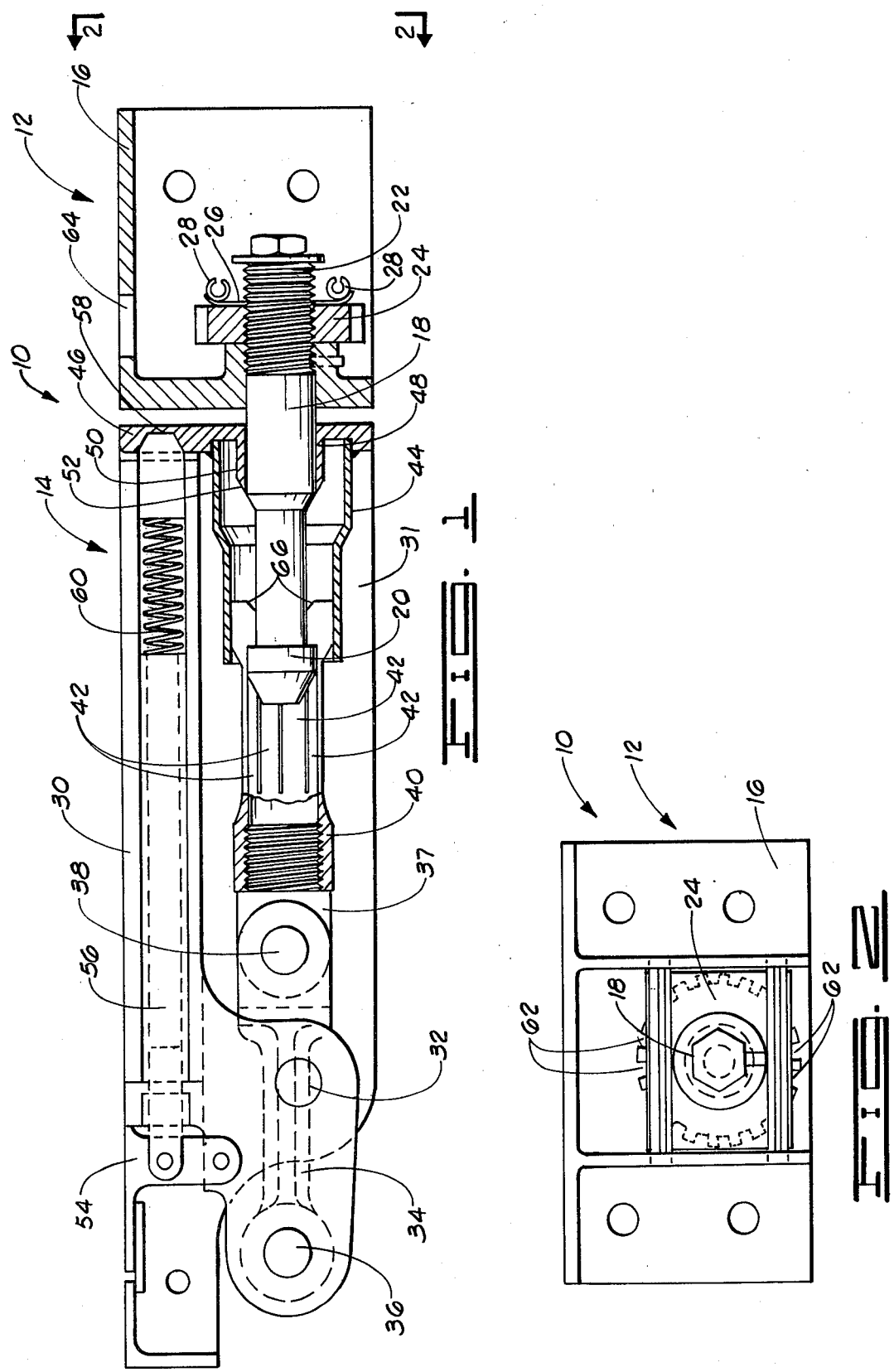

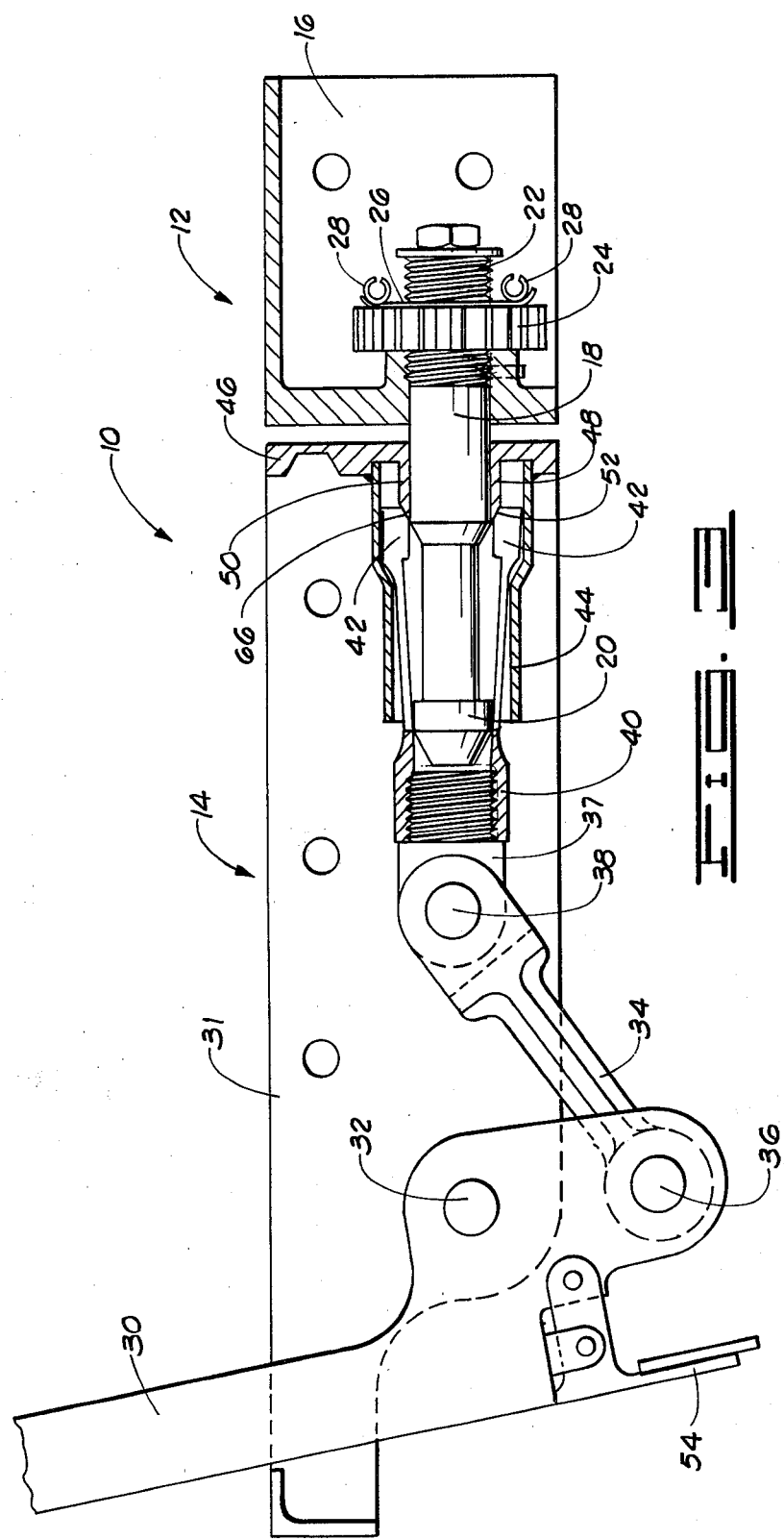

COWLING LATCH

BACKGROUND OF THE INVENTION

This invention relates to a latch and more particularly to a cowling latch for an engine nacelle used in airframe construction.

Heretofore, there have been various types of latches used on engine cowlings and more particularly the standard latch includes a hook used for engaging an eye bolt with an over center handle for tightening the engine cowling. A shear device is required in addition to the hook and eye bolt for alignment of the joining structures and to prevent movement in shear.

Also, various types of self-adjusting and self-aligning latches and locks are disclosed in U.S. Pat. No. 1,966,043 to Page, U.S. Pat. No. 2,421,689 to Elkin, U.S. Pat. No. 2,550,337 to Duffendack et al, U.S. Pat. No. 2,592,647 to Black, U.S. Pat. No. 2,712,955 to Andrews, U.S. Pat. No. 2,894,777 to Hogan, U.S. Pat. No. 3,510,162 to Smith and U.S. Pat. No. 3,791,688 to Bailey. None of the above patents nor the presently used cowling latches are similar to the subject invention described herein and having the advantages of this new type of latch.

SUMMARY OF THE INVENTION

The cowling latch described herein is simple in design, rugged in construction and is easily adjustable when securing a cowling surrounding an aircraft engine.

The latch while described for use in aircraft cowlings, may be readily adaptable for various uses where a latch of this type is required in securing together certain structures.

The cowling latch uses a collet assembly for securing a pin attached to a keeper assembly therein and prevents movement in tension and in shear and does not require the addition of various types of shear devices used in prior art cowling latches.

The pin extending outwardly from the keeper assembly acts as a guide when the latch assembly is closed adjacent the keeper assembly and the pin is received inside the collet.

The cowling latch for an engine nacelle or the like includes a keeper assembly having a pin with a pin head extending outwardly therefrom. A latch assembly having a latch handle pivotally attached thereto includes a collet assembly for receiving the pin head therein when the latch handle is in an opened position. When the handle is closed on the latch assembly, the collet having collet fingers extending outwardly therefrom close around the pin head securing the pin therein and preventing movement of the latch in both tension and shear.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a side view of the cowling latch with a portion of the collet assembly in cut-away and the latch handle in a closed position.

FIG. 2 is an end view taken along lines 2-2 shown in FIG. 1.

FIG. 3 is a side view of the cowling latch with the latch handle in an opened position for releasing the collet fingers from the pin extending outwardly from the keeper assemby and received in the collet assembly.

DETAILED DESCRIPTION OF THE DRAWINGS

In FIG. 1 a side view of the cowling latch is shown and designated by general reference numeral 10. Broadly, the latch 10 includes a keeper assembly 12 and a latch assembly 14 which are disposed adjacent each other when the latch 10 is secured. The cowling structure is not shown in the drawings.

The keeper assembly 12 includes a keeper housing 16 having one end of a pin 18 extending outwardly therefrom and having a pin head 20. An opposite end 22 of the pin 18 is threaded and mounted in the keeper assembly 16 and secured thereto. Threaded around the end 22 of the pin 18 is an adjustment wheel 24 which is held in place in the keeper assembly 16 by an adjustment wheel detent spring 26 and detent spring pins 28.

The latch assembly 14 includes a latch handle 30 which is an over center handle and pinned to a latch housing 31 by a pin 32 disposed on opposite sides of the latch housing 31. The handle 30 is also pinned to a link arm 34 by a pin 36. The link arm 34 is pinned to a threaded connecting arm 37 by a pin 38. The connecting arm 37 is secured to the threaded end of a collect 40 having a plurality of collet fingers 42 extending outwardly therefrom for engaging the pin head 20. In FIG. 1 an upper and lower collet finger 42 can be seen along with two collet fingers 42 on the opposite side with the ends of the fingers 42 hidden behind the pin head 20. Also, there are additional collet fingers 42 which have been cut-away to expose the fingers 42 as shown. it can be appreciated that any number of collet fingers 42 can be used to accomplish the purpose of securing the pin head 20 there between.

The latch assembly 14 further includes a circular hollow collet guide 44 for receiving the ends of the collet fingers 42 which slide against the sides therein and also receive a portion of the pin 18 and the pin head 20 therein. The collet guide 44 is mounted in the housing 31 with the end of the guide 44 attached to a collet expander end plate 46 mounted on the end of the latch housing 31. The collet expander end plate 46 includes an aperture 48 for receiving the pin 18 therethrough. The plate 46 also includes a circular cam 50 having a cam surface 52 surrounding the aperture 48.

In FIG. 1 the handle 30 is shown in a closed position. To open the handle 30 a standard handle release trigger 54 is used which is linked to a lock bolt 56 having one end of the lock bolt 56 received inside a bore 58 in the end plate 46. By pressing the handle release trigger 54 downwardly, the lock bolt 56 is moved to the left overcoming the bias force of a spring 60 surrounding the lock bolt 56 with the end of the bolt 56 urged away from the bore 58 thereby releasing the handle 30 so it may be rotated in a counter clockwise direction away from the latch housing 31.

In FIG. 2 an end view of the keeper assembly 12 can be seen taken along line 2-2 shown in FIG. 1. In this view, the adjustment wheel 24 can be seen having a plurality of serrations 62 therearound. By using a screwdriver through an access slot 64 shown in FIG. 1 in the top of the keeper assembly 16 or through an open bottom of the keeper assembly 16, the wheel 24 can be rotated for adjusting the tension on the pin 18 when it is secured inside the collet guide 44 by the ends of the collet fingers 42.

In FIG. 4 the handle release trigger 54 has been urged downwardly with the lock bolt 56 releasing the handle 30 so it may be rotated counter clockwise on pin 32. As the handle 30 is rotated in a counter clockwise direction the link arm 34 urges the connecting arm 37 to the right thereby moving the collet 40 with collet fingers 42 inwardly into the collet guide 44. As the collet fingers 42 move inwardly a beveled edge 66 of the collet fingers 42 contact the cam surface 52 of the circular cam 50. When this contact is made the ends of the collet fingers 42 are moved upwardly providing an opening which is sufficient so the pin head 20 of the pin 18 can be removed from inside the collet guide 44 when it is desired to move the latch assembly 14 away from the keeper assembly 16.

While the engine cowling is not shown it can be appreciated the above described cowling latch 10 having the keeper assembly 12 and latch assembly 14 are readily adaptable for various types of latching and locking arrangement used for engine nacelle design. Also this unique cowling latch 10 eliminates the use of the standard hook and eye bolt which heretofore required an additional use of a shear device to prevent movement both in tension and in shear.

Changes may be made in the construction and arrangement of the parts or elements of the embodiments as described herein without departing from the spirit or scope of the invention defined in the following claims.

What is claimed is:

1. A cowling latch for an engine nacelle or the like, the latch comprising:
a keeper assembly having a pin extending outwardly therefrom;
a latch assembly having a latch handle pivotally mounted thereon, the latch assembly having a collet expander end plate mounted on one end of the assembly and adjacent the keeper assembly when the assemblies are disposed adjacent each other, the end plate having an aperture therethrough for receiving the pin, the end plate having a circular cam surface surrounding the aperture; and
a collet assembly mounted in the latch assembly and having one end linked to the latch handle, the collet assembly receiving one end of the pin therein when the latch handle is in an opened position and the latch assembly is disposed adjacent the keeper assembly, the collet assembly securing the pin therein when the latch handle is in a closed position, the collet having a collet linked to the latch handle, the collet having collet fingers extending outwardly therefrom and received in a circular hollow collet guide, the pin received inside the collet guide and secured by the ends of the collet fingers when the latch handle is in a closed position, the ends of the collet fingers engaging the cam surface of the end plate when the latch handle is open and the cam surface expands the fingers outwardly for releasing the pin received in the collet guide.

2. The latch as described in claim 1 wherein the keeper assembly includes an adjustment wheel mounted therein and threaded around one end of the pin, by rotating the adjustment wheel the pin is moved lengthwise along its axis and inwardly and outwardly from the keeper assembly.

3. A cowling latch for an engine nacelle or the like, the latch comprising:
a keeper assembly having a pin extending outwardly therefrom, the pin having a pin head at one end thereof;
a latch assembly having a latch handle pivotally mounted thereon, the latch assembly having a collet expander end plated mounted on one end of the assembly and adjacent the keeper assembly when the assemblies are disposed adjacent each other, the end plate having an aperture for receiving a portion of the pin and the pin head therethrough, the end plate having a circular cam surface around the aperture; and
a collet assembly mounted in the latch assembly and including a collet linked to the latch handle, the collet having collet fingers extending outwardly therefrom and received in a circular hollow collet guide, a portion of the pin and the pin head received inside the collet guide when the ends of the collet fingers are secured around the pin head and the latch handle is in a closed position, the ends of the collet fingers engaging the cam surface of the end plate when the latch handle is in an opened position and the cam surface expanding the fingers outwardly for releasing the pin head received in the collet guide.

4. The latch as described in claim 3 wherein the keeper assembly includes an adjustment wheel mounted therein and threaded around the opposite end of the pin, by rotating the adjustment wheel the pin and pin head are moved lengthwise along the pin axis and inwardly and outwardly from the keeper assembly.

5. The latch as described in claim 3 wherein the ends of the collet fingers have a portion thereof beveled for engaging the cam surface of the end plate when the collet and collet fingers are moved toward the end plate when the latch handle is in an opened position.

* * * * *